Patented Aug. 20, 1940

2,211,948

UNITED STATES PATENT OFFICE 2,211,948

ARTIFICIAL CELLULOSIC MATERIAL BONDED TO RUBBER AND METHOD OF PRODUCING THE BOND

Albert Hershberger, Kenmore, N. Y., assignor, by mesne assignments, to E. I. du Pont de Nemours & Company, Wilmington, Del., a corporation of Delaware No Drawing. Application February 15, 1936, Serial No. 64,181

13 Claims. (Cl. 154—40)

This invention relates to the treatment of cellulosic materials to improve the adhesion thereof to natural rubber, compounded rubber, rubber substitutes and the like. More particularly, it relates to methods for obtaining improved adhesion between rubber and cellulosic threads, filaments, cords, fabrics, and the like, and the products resulting from such methods. This invention is especially applicable to artificial threads as will be explained more in detail below.

In the past it has been found that artificial threads such as regenerated cellulose threads, filaments, cords, or the like, adhere very poorly to compounded rubber stock when the two are united and the rubber stock subsequently cured according to any of the known processes which produce commercially satisfactory adhesion between rubber and cotton. This poor adhesion of artificial threads to rubber has constituted a very serious obstacle to their use in place of cotton in the manufacture of automobile tires, reinforced rubber belts and similar products consisting of alternate plies of rubber and cord which are required to adhere very strongly for long periods of time under drastic conditions of high temperature, constant flexing and bending, shock, etc. Artificial threads would frequently be preferable to cotton in such uses because of their higher tensile strength, especially at elevated temperatures and because of their continuous filament structure. If rayon cord, for example, is pressed into commercial rubber stock such as is customarily used in the manufacture of tires or belting and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It has now been discovered that the treatment of rayon cord with an aqueous solution of materials capable of reacting and setting up or polymerizing at the elevated temperature commonly encountered in the drying of the cord or in the curing process to form on and probably in the cord a substantially insoluble, infusible resin will greatly improve the adhesion of the rayon cord to rubber. It has also been found that the adhesion is still further improved if the rayon cord is treated with the reacting materials in combination with dispersed rubber or rubber latex. The rayon cord resulting from treatment according to this invention adheres to rubber at least as well and usually better than cotton cord and from 2 to 3 times as well as untreated rayon cord.

It is an object of this invention to provide a method of securing improved adhesion between cellulosic material and rubber.

It is another object of this invention to provide a method for securing improved adhesion between rayon or other filamentous forms of regenerated cellulose and rubber.

A more specific object of this invention is to provide a method for securing improved adhesion between filaments or threads of cellulosic material and rubber by means of certain heat-hardening synthetic resins in combination with the said filaments, threads, or the like.

A still further object of this invention is to produce artificial threads such as regenerated cellulose, to which rubber may be more firmly adhered by reason of the presence on and/or in the artificial threads of certain heat-hardening, synthetic resins, preferably together with dispersed rubber or latex.

Other objects will appear from the following description and appended claims.

The objects of the invention are accomplished in general by applying to cellulosic structures, such as cellulosic threads or the like, a treating composition containing certain heat-hardening synthetic resins, and preferably also dispersed rubber or latex, whereby to improve the adhesion between the cellulosic thread and rubber after their combination and vulcanization of the rubber.

In order to set forth more clearly and concisely the principles of the invention, it will be described with particular reference to rayon made by the viscose process and having a dry tensile strength of 2 grams or more per denier, and preferably of 2.5 grams or more per denier, in the form of heavy cords. It is to be understood, however, that other cellulosic filaments, threads, or cords, comprising, for example, a cellulose ester or ether or hydroxy ether, or the like, or of regenerated cellulose made by the cuprammonium or other process, is contemplated as being within the scope of this invention. The invention is most beneficially applied to the treatment of filaments, threads, cords and the like obtained by extrusion and coagulation of aqueous cellulosic solutions such as viscose, aqueous cuprammonium cellulose solutions, aqueous solutions of lowly etherified cellulose and aqueous solutions of lowly esterified cellulose.

The invention includes cords and fabrics of any type of construction made from such cellulosic threads or filaments. Obviously, where a cellulose derivative, such as cellulose acetate, which is thermoplastic in nature, is used, the temperature to which the material is subjected in the various steps of the process must be kept well below the softening point of the cellulose derivative. Furthermore, the materials, with which the derivative is treated must be so chosen that the steps of the process can be carried out at a temperature below the softening point of the cellulose derivative.

The preferred cellulosic material used in this invention is in the form of strong rayon threads having a dry tensile strength at room temperature of above 2 grams per denier, prepared in the manner taught by H. H. Parker in his copending patent application Serial No. 676,463, filed June 19, 1933, or in the form of twisted structures, such as strands, or cords plied from said strong rayon threads.

As the rubber to which such cellulosic thread structures will adhere, the invention contemplates any compounded natural rubber stock or any compound synthetic rubber stock such as polymerized isoprene, or polymerized butadiene, or halogen substituted butadiene such as halogen-2-butadiene 1,3 polymer, e. g. chloro-2-butadiene 1,3 polymer, and other types. Moreover, the rubber may contain any desired vulcanizers, stabilizers, accelerators, et cetera, singly or in any desired combination. In its preferred and common form the invention contemplates any commercial compounded rubber stock such as is commonly employed in the fabrication of automobile tires, hose, raincoat material, shoes, belting such as conveyor belts, fan belts or other driving belts, or the like.

The term "rubber," unless otherwise modified, as used in the specification and claims, is intended to be used in its generic sense to include rubber substitutes, natural rubber, compounded rubber, synthetic rubbers, and the like.

As the means for improving the adhesion of the cellulosic thread structure to rubber this invention contemplates a substantially insoluble, infusible synthetic resin preferably together with dispersed natural or synthetic rubber or rubber latex. The synthetic resins suitable for this invention belong to the general class of amine-aldehyde resins and more particularly aromatic amine-aldehyde resins and are preferably resins formed from aromatic amines and aldehydes both water soluble at least to the extent of from 2 to 5% by weight and capable of condensing, polymerizing or setting up rapidly and completely to a substantially insoluble, infusible form with or without a catalyst or condensing agent at a temperature of 250° F. or less such as cord is generally subjected to during the drying and vulcanizing or curing operations in the manufacture of tires, belts and the like.

As the amines and more particularly the aromatic amines possessing these qualifications and therefore particularly suitable for use in the operation of this invention may be mentioned amine derivatives of benzene such as aniline, dimethyl aniline, p-amino dimethyl aniline, phenylene diamine, diphenylamine and the like. Likewise amine derivatives of naphthalene are suitable for use in the operation of this invention such as beta-naphthyl dimethyl amine, diamino naphthyl amine and beta-naphthyl amine. The preferred concentration of aromatic amine is between 0.5 and 5% by weight. It is understood that these aromatic amines may be used singly or in any combination or in combination with any suitable aliphatic amine. It is also understood that this invention is not limited to these specific aromatic amines since various other aromatic amines having one, two or more cyclic nuclei may be used. Aromatic amines having a lower solubility than 2% by weight for example can be employed in the form of aqueous dispersions. Aromatic amines which react rather slowly with aldehydes at the temperatures commonly used in this invention can often be caused to partially condense or polymerize with the aldehyde before application to the cellulosic structure thus lessening the time subsequently necessary for substantially complete polymerization.

If desirable, the time or temperature, or both, of drying the cord after passage through the aqueous solution of resin-forming materials, or the time or temperature, or both, of curing or vulcanization may be varied from those ordinarily used in manufacturing tires, belting, and the like, in order to insure complete condensation and polymerization of less readily reactive aromatic amine-aldehyde combinations. However, as has been indicated, it is easily possible according to this invention and usually preferable to select for use in improving adhesion, aromatic amines and aldehydes which can be satisfactorily applied to current commercial processes without necessitating any essential changes in procedure.

Usually it is desirable to add to the aqueous solution of resin forming materials containing aromatic amines and an aldehyde a small amount of catalyst or condensing agent for the polymerization reaction. Such catalysts or condensing agents are usually materials which are basic in nature. Of these sodium hydroxide is most commonly employed and may be added in any desired amount according to the special character of the solution in which it is to be used. The preferred concentration, however, is between 0.02 and 0.5 per cent by weight. Other substances than sodium hydroxide may of course be used such as, for example, potassium hydroxide, ammonium hydroxide, various aliphatic amines and the like depending to some extent upon the nature of the aromatic amine and aldehyde used.

Where latex is to be used in combination with the resin the amount of sodium hydroxide should be preferably between 0.2 and 0.3%. The amount of alkaline catalyst may be more specifically determined by the pH required or desired in the solution of resin forming material and in dispersed rubber or latex. It may be desirable to adjust the pH of the resin solution so that it will be approximately the same as the pH of the dispersed rubber or latex solution in which it is used. Thus, the amount of alkaline catalyst which is used may be determined by the amount required to bring the pH of the solution to some predetermined value, as for instance 8.5 to 9.

While treatment of rayon with such an aqueous solution of resin forming materials as has been described with subsequent polymerization of these materials to a substantially infusible, insoluble resin on and probably in the cellulosic structure improves the adhesion of rayon to rubber it is preferred according to this invention to employ the treatment with an aqueous solution of resin forming materials in combination with dispersed rubber or rubber latex as giving still more marked improvement in adhesion. This may be accomplished in a number of ways, the simplest and most convenient of which contemplates the combination of an aqueous dispersion of rubber or rubber latex with the aqueous solution of resin forming materials before application to the rayon. The latex or rubber may be present in the solution for treating the rayon in any desired proportion although the improvement in adhesion is most marked when concentrations of rubber or latex solids are used which are between 5% and 40% by weight and preferably between 10% and 25% by weight. If a natural latex dispersion is used, it may be either crude latex, a creamed latex, that is to say, a latex from which certain soluble materials such as sugar, acid, soluble resins, soluble proteins, etc. have been removed, or one which contains added materials, or one which has been treated to change the character of the rubber in it, for instance by degradation or oxidation or both. Furthermore, it may contain any desired accelerators, vulcanizers, stabilizers, dispersing agents, or any other substances which are commonly employed in the rubber industry. When rubber is used as an artificial dispersion in water of either natural rubber or of any known synthetic rubber, it may likewise contain additionally such substances as rubber accelerators, vulcanizers, stabilizers, dispersing agents and the like. The type or kind of rubber dispersion or rubber latex to be used depends to some extent upon the type or kind of rubber stock to which it is desired to bond the treated rayon. For example to obtain good adhesion between treated rayon and synthetic rubber composed of chloro-2-butadiene 1,3 polymer it is preferable to treat the rayon with an aqueous solution of resin forming materials in combination with chloro-2-butadiene 1,3 polymer latex. The thread treating composition may also contain other materials such as casein, glutinous materials, water soluble adhesives, wetting agents, and the like, which may be added as adhesives, stabilizers, or for a variety of purposes without departing from the fundamental principle of this invention.

Variations in the procedure for preparing an aqueous solution containing an aromatic amine, an aldehyde, a suitable catalyst and dispersed rubber or rubber latex may be employed depending upon the concentration of the resin forming materials and rubber solids desired in the finished composition or depending upon the ratio of resin forming materials to rubber solids or depending upon the specific resin forming materials used. The simplest and most convenient method consists in dissolving the aromatic amine, aldehyde, and catalyst in water and stirring the solution of resin forming materials into the aqueous dispersion of rubber or rubber latex. In certain cases it may be desirable to employ instead of a freshly prepared solution of the resin forming materials a solution containing the partially polymerized resin, prepared by allowing a solution containing the aromatic amine, aldehyde and catalyst to stand at a temperature of from 25° to 30° C. for from 5 to 20 hours during which time gradual polymerization of the aromatic amine and aldehyde takes place. This polymerization may likewise be carried out by heating the solution containing the resin forming materials at an elevated temperature. The use of a partially polymerized resin solution is preferred in certain cases such as for example in case a high solids concentration of resin forming material and dispersed rubber or rubber latex is desired at which concentration there may be a tendency for a freshly prepared solution of aromatic amine, aldehyde and catalyst to coagulate or precipitate the dispersion of rubber or rubber latex to which it is added.

Instead of applying dispersed rubber or rubber latex to the cord together with the resin forming materials in a single step from an aqueous solution which contains both the resin forming materials and the dispersed rubber or rubber latex this invention also contemplates as a method for improving the adhesion of rayon to rubber the steps of treating the rayon with an aqueous solution of the resin forming materials, subsequently drying the cord at a temperature sufficient to cause the polymerization of the resin and then treating the resulting resin coated rayon with a solution of rubber in toluene or other suitable rubber solvent, drying the so treated cord to evaporate the solvent so that the cord has a coating of resin and on that a coating of rubber. The rubber solution used may be a solution of either natural or synthetic rubber and may be either raw rubber or rubber compounded with any of the usual accelerators, vulcanizers, stabilizers and the like which are commonly added to rubber or of rubber degraded, oxidized or otherwise modified.

Other variations in the method of applying to rayon cord a substantially insoluble, infusible resin and rubber or rubber latex to improve the adhesion of the cord to rubber are also possible according to this invention. For instance the cord may be treated first with an aqueous solution of an aromatic amine, an aldehyde and a suitable catalyst and dried at a temperature to polymerize the resin and then with an aqueous solution containing an aromatic amine, an aldehyde and a suitable catalyst to which dispersed rubber or rubber latex has also been added. Or the rayon cord may be given two treatments, the first with an aqueous solution of an aromatic amine, an aldehyde, a suitable catalyst and dispersed rubber or rubber latex and then with the same aqueous solution of resin forming materials containing dispersed rubber or rubber latex or with a different aqueous solution of resin forming materials containing dispersed rubber or rubber latex and containing a different ratio of resin forming materials to rubber solids. It is understood that after each aqueous treatment the cord is dried before the application of the next successive treatment.

The application of a composition containing an aromatic amine, an aldehyde, a suitable catalyst and a dispersion of rubber or rubber latex from an aqueous solution to rayon cord or fabric may be accomplished in a number of ways. For example, the rayon cord or fabric may be passed through the composition contained in a tank then between two doctor knives or squeeze rolls to remove the excess composition from the cord or fabric and thence over a series of dryer rolls maintained at a temperature sufficiently high to dry out the cord or fabric and to condense or polymerize the resin. At some stage of the drying process the temperature of the treated cord or fabric should be raised to from 85° to 100° C. to insure complete condensation or polymerization of the resin forming materials. Other equally suitable means for applying the composition containing the resin forming materials and rubber to rayon cord or fabric may be employed such as by means of transfer rolls, by spraying, by brushing, etc. Likewise drying of the treated rayon cord or fabric may be accomplished in other ways, such as for example by means of a belt or frame carrying the treated rayon cord or fabric through a heated closed chamber, etc.

If rayon tire cord, treated with an aqueous dispersion containing an aromotic amine, an aldehyde, a suitable catalyst and a rubber dispersion or rubber latex and dried at an elevated temperature in the manner described by this invention is placed upon a commercial compounded rubber stock such as is customarily used in the manufacture of tires and the whole is cured at high pressure and elevated temperature sufficient to vulcanize the rubber stock completely, the treated rayon cord is found to strongly adhere to the rubber. Indeed if the cord is subjected to a standard pull-out test which measures the force required to separate the cord from the rubber and therefore constitutes a measure of the adhesion between the cord and rubber it is found that the adhesion between the treated rayon and rubber is at least equal to and often greater than that obtained between cotton and rubber and may be two or even more times better than the adhesion between untreated rayon and rubber. If the treated rayon cord is subjected to a standard pull-out test at an elevated temperature, for example, at 270° F., to measure the adhesion between the cord and rubber at this temperature the adhesion is found to be equal to and often better than the adhesion of cotton cord to rubber at this temperature, a fact which is of utmost importance in the construction of tires, fan belts and similar articles which develop a high temperature under ordinary conditions of usage. This constitutes a great advantage in the above described treatment over a number of other adhesion treatments which when applied to rayon result in a treated cord with good adhesion to rubber at room temperature but with poor adhesion to rubber at an elevated temperature.

In addition to improving the adhesion of rayon to rubber by treating the rayon with an aqueous solution of an aromatic amine, an aldehyde and a suitable catalyst and containing dispersed rubber or rubber latex as hereinbefore described, this treatment greatly increases the length of time a pad consisting of plies of so treated cords or fabrics to which a skim coat of compounded rubber stock has been applied and the whole subjected to sufficient pressure and temperature to completely vulcanize the rubber may be flexed and bent under tension before separation of the plies takes place. For example where such a pad prepared from untreated rayon may be flexed 2000 times and a similar pad prepared from cotton may be flexed 17,000 times before separation of the plies takes place a similar pad prepared from rayon treated according to the teaching of this invention may be flexed 30,000 times before separation of the plies takes place, a fact which is of utmost importance in the construction of tires.

Furthermore, rayon cord treated according to this invention in order to improve its adhesion to rubber undergoes no marked decrease in fatigue resistance. Fatigue resistance of a tire cord is measured in a variety of ways in one of which the cord is subjected for a fixed number of flexings to drastic conditions of flexing and simultaneously stretching at an elevated temperature which conditions approximate those encountered during the actual use of tires. The tensile strength of the cord after the prescribed flexing and stretching compared with the tensile strength before the test gives a measure of the fatigue resistance of the cord. For rayon cord treated according to this invention the drop in tensile strength after the fatigue resistance test is very slight whereas cotton cord loses its tensile strength entirely when subjected to the same test. This improved resistance to fatigue at elevated temperatures exhibited by rayon cord treated according to this invention is a great advantage in cord designed for use in tires, fan belts and the like which develop a high temperature under ordinary conditions of usage and at the same time undergo constant and severe flexing, bending and stretching.

In addition to the foregoing advantages in the use of an aqueous solution of an aromatic amine, an aldehyde and a suitable catalyst combined with a dispersion of rubber or rubber latex for improving the adhesion of rayon to rubber is the fact that this treatment does not excessively stiffen or harden the rayon cord or fabric which is treated. Other advantages are the ease with which the treatment may be applied to rayon cord or fabric which makes unnecessary any changes in equipment in current commercial processes in use for the treatment of fabrics or individual cords and the cheapness and ready availability of the raw materials, i. e., aromatic amines, aldehydes and latex.

In order more clearly to illustrate this invention the following examples are given. It is, of course to be understood that the invention is not limited to these precise examples which are merely illustrative of the invention. Obviously other modifications will occur to those skilled in the art which however do not depart from the spirit and nature of this invention.

*Example I*

An aqueous solution is prepared containing 2% by weight of aniline, 3% by weight of hexamethylene tetramine, 0.1% by weight of sodium hydroxide and 15% by weight of natural rubber latex solids. Cord made from viscose process rayon and of construction suitable for use in automobile tires, for example cord made from rayon thread, said thread having a dry strength at room temperature of about 3 grams per denier, produced in accordance with the process taught by H. H. Parker in the copending patent application Serial No. 676,463, filed June 19, 1933, is passed through the said aqueous solution of this example slowly enough to be thoroughly wet and is then dried at a temperature of 85° C. or higher by passage over heated rollers or by other suitable means and is then laid upon a thin sheet of compounded rubber stock and the whole subjected to sufficient temperature and pressure to completely vulcanize the rubber. After curing the rayon cord is found to adhere very firmly to the rubber so that a force is required to separate it which is at least twice as great as is required for bare untreated rayon and is approximately equal to or greater than that required in case of untreated cotton cord used in the manufacture of tires.

*Example II*

An aqueous solution is prepared containing 2% by weight of aniline, 2% by weight of crotonaldehyde, 0.1% by weight of sodium hydroxide and 20% by weight of natural rubber latex solids. Rayon tire cord is passed through this solution, dried, applied to compounded rubber stock and the cord and rubber cured or vulcanized just as described in Example I to give a product exhibiting good adhesion between the rayon cord and rubber.

Example III

An aqueous solution is prepared containing 2% by weight of p-amino dimethyl aniline, 1.6% by weight of formaldehyde (added as 2½ times that amount of 40% commercial formaldehyde), 0.1% by weight of sodium hydroxide and 15% by weight of rubber latex solids containing suitable accelerators, vulcanizers, stabilizers, etc. Rayon tire cord is passed through this solution, dried, applied to compounded rubber stock and the cord and rubber cured or vulcanized just as described in Example I to give a product exhibiting good adhesion between the rayon cord and rubber.

Example IV

An aqueous solution is prepared containing 2% by weight of m-phenylene diamine, 3% by weight of dimethylol amine prepared by mixing together equivalent proportions of formaldehyde and dimethyl amine, 0.1% by weight of sodium hydroxide and 20% by weight of natural rubber latex solids. Rayon tire cord is passed through this solution, dried, applied to compounded rubber stock and the cord and rubber cured or vulcanized just as described in Example I to give a product exhibiting good adhesion between the rayon cord and rubber.

Example V

An aqueous solution is prepared containing 2% by weight of alpha-naphthyl amine, 1.2% by weight of formaldehyde (added as 2½ times that amount of 40% commercial formaldehyde), 0.1% by weight of sodium hydroxide and 20% by weight of natural rubber latex solids. Rayon tire cord is passed through this solution, dried, applied to compounded rubber stock and the cord and rubber cured or vulcanized just as described in Example I to give a product exhibiting good adhesion between the rayon cord and rubber.

Example VI

An aqueous solution is prepared containing 2% by weight of m-phenylene diamine, 2% by weight of hexamethylene tetramine and 0.5% by weight of formic acid. Rayon tire cord is passed through this solution, dried, applied to compounded rubber stock and the cord and rubber cured or vulcanized just as described in Example I to give a product exhibiting good adhesion between the rayon cord and the rubber.

Example VII

An aqueous solution is prepared containing 2% by weight of aniline hydrochloride, 1.2% by weight of formaldehyde (added as 2½ times that weight of 40% commercial formaldehyde) and 10% natural acidified latex solids. The acidified latex is prepared by any of the known methods for preparing such a latex such as for example by stabilizing a natural rubber latex by means of a small amount of ammonium caseinate, removing the ammonia present in the latex by the addition by the required amount of formaldehyde and adding with stirring to the stabilized ammonia free latex an excess of acetic acid to bring the pH of the latex below 6. Rayon tire cord is passed through this solution, dried, applied to compounded rubber stock and the cord and rubber cured or vulcanized just as described in Example I to give a product exhibiting good adhesion between the rayon cord and rubber.

A particularly good latex for use according to the methods described in the examples comprises a so-called creamed latex prepared by treating natural rubber latex with soap, ammonium alginate, and the like, creaming as by whipping or other vigorous agitation at a temperature of 70–90° C., skimming, and using the top portion which has been skimmed off. The creamed latex is then used in the same way as the various latices disclosed in the examples.

Instead of drying the cord at elevated temperature such as 185° F. as set forth in the preceding examples, the impregnated cord may be dried at room temperature or thereabouts and subsequently vulcanized to the rubber at the customary temperatures.

Since it is obvious that many changes and modifications of the invention can be made within the nature and spirit thereof, it is to be understood that the invention is not to be limited thereto except as set forth in the appended claims.

I claim:

1. In the process of manufacturing reinforced rubber articles such as rubber tires and the like, the steps which comprise treating threads, cords, fabrics and the like prepared from continuous artificial cellulosic filaments with an aqueous solution containing, as essential bonding ingredients, an amine and sufficient aldehyde to react with the amine to form an infusible, insoluble resin, treating the threads, cords, fabrics and the like to convert at least a portion of the resin-forming materials to an infusible, insoluble resin, associating the article so treated with vulcanizable rubber, and then subjecting the mass to a vulcanizing temperature.

2. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, an amine and sufficient aldehyde to react with the amine to form an infusible, insoluble resin, treating the threads, cords, fabrics and the like to convert at least a portion of the resin-forming materials to an infusible, insoluble resin, associating the article so treated with vulcanizable rubber, and then subjecting the mass to a vulcanizing temperature.

3. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, rubber latex together with an aromatic amine and sufficient aldehyde to react with the aromatic amine to form an infusible, insoluble resin, treating the threads, cords, fabrics and the like to convert at least a portion of the resin-forming materials to an infusible, insoluble resin, associating the article so treated with vulcanizable rubber, and then subjecting the mass to a vulcanizing temperature.

4. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, rubber latex together with an aromatic amine and sufficient formaldehyde to react with the aromatic amine to form an infusible, insoluble resin and a resin-forming catalyst, heating the threads, cords, fabrics and the like, so treated, at a temperature sufficiently elevated to convert at least a portion of the resin-forming materials to an infusible, insoluble resin, associating the article so treated with vulcanizable rubber, and then subjecting the mass to a vulcanizing temperature.

5. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier and obtained from viscose, with an aqueous solution containing, as essential bonding ingredients, rubber latex together with aniline and sufficient formaldehyde to react with the aniline to form an infusible, insoluble resin and an alkaline catalyst, heating the threads, cords, fabrics and the like, so treated, at a temperature sufficiently elevated to convert at least a portion of the resin-forming materials to an infusible, insoluble resin, associating the article so treated with vulcanizable rubber, and then subjecting the mass to a vulcanizing temperature.

6. In the process of manufacturing reinforced rubber articles such as rubber tires and the like, the steps which comprise treating threads, cords, fabrics and the like prepared from continuous artificial cellulosic filaments with an aqueous solution containing, as essential bonding ingredients, an amine and sufficient aldehyde to react with the amine to form an infusible, insoluble resin, drying the threads, cords, fabrics, and the like so treated, plying the same with sheets of commercial compounded vulcanizable rubber, and then subjecting the mass to a vulcanizing temperature.

7. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, an amine and sufficient aldehyde to react with the amine to form an infusible, insoluble resin, drying the threads, cords, fabrics, and the like so treated, plying the same with sheets of commercial compounded vulcanizable rubber, and then subjecting the mass to a vulcanizing temperature.

8. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous solution containing, as essential bonding ingredients, rubber latex, together with an aromatic amine and sufficient formaldehyde to react with the aromatic amine to form an infusible, insoluble resin, and a resin-forming catalyst, drying the threads, cords, fabrics, and the like so treated, plying the same with sheets of commercial compounded vulcanizable rubber, and then subjecting the mass to a vulcanizing temperature.

9. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier and obtained from viscose, with an aqueous solution containing, as essential bonding ingredients, rubber latex, together with aniline and sufficient formaldehyde to react with the aniline to form an infusible, insoluble resin, and an alkaline catalyst, drying the threads, cords, fabrics, and the like so treated, plying the same with sheets of commercial compounded vulcanizable rubber, and then subjecting the mass to a vulcanizing temperature.

10. Vulcanized rubber articles, such as rubber tires and the like, reinforced with threads, cords, fabrics and the like prepared from continuous artificial cellulosic filaments, said threads, cords, fabrics and the like being adhered to the vulcanized rubber in said articles by means of a composition comprising, as an essential bonding ingredient, an infusible, insoluble amine-aldehyde resin.

11. Vulcanized rubber articles, such as rubber tires and the like, reinforced with threads, cords, fabrics and the like prepared from continuous regenerated cellulose filaments having a dry tenacity at room temperature of above two grams per denier, said threads, cords, fabrics and the like being adhered to the vulcanized rubber in said articles by means of a composition comprising, as an essential bonding ingredient, an infusible, insoluble aromatic amine-aldehyde resin.

12. Vulcanized rubber articles, such as rubber tires and the like, reinforced with threads, cords, fabrics and the like prepared from continuous regenerated cellulose filaments having a dry tenacity at room temperature of above two grams per denier obtained from viscose, said threads, cords, fabrics and the like being adhered to the vulcanized rubber in said articles by means of a composition comprising, as essential bonding ingredients, an infusible, insoluble aromatic amine-formaldehyde resin and rubber.

13. Vulcanized rubber articles, such as rubber tires and the like, reinforced with threads, cords, fabrics and the like prepared from continuous regenerated cellulose filaments having a dry tenacity at room temperature of above two grams per denier obtained from viscose, said threads, cords, fabrics and the like being adhered to the vulcanized rubber in said articles by means of a composition comprising, as essential bonding ingredients, an infusible, insoluble aniline-formaldehyde resin and rubber.

ALBERT HERSHBERGER.